United States Patent [19]

Kim

[11] Patent Number: 5,625,422

[45] Date of Patent: Apr. 29, 1997

[54] METHOD FOR CHANNEL SELECTION AND TUNING BASED UPON SET CHANNEL POSITIONS

[75] Inventor: Tae Y. Kim, Seoul, Rep. of Korea

[73] Assignee: Goldstar Co., Ltd., Seoul, Rep. of Korea

[21] Appl. No.: 361,375

[22] Filed: Dec. 22, 1994

[30] Foreign Application Priority Data

Dec. 22, 1993 [KR] Rep. of Korea ................. 29107/1993

[51] Int. Cl.$^6$ .................................................. H04N 5/50
[52] U.S. Cl. ........................................ 348/731; 348/732
[58] Field of Search ................................. 348/731, 734, 348/732; H04N 5/45, 5/50

[56] References Cited

U.S. PATENT DOCUMENTS

| | | | |
|---|---|---|---|
| 4,914,517 | 4/1990 | Duffield | 348/731 |
| 4,959,720 | 9/1990 | Duffield et al. | 348/731 |
| 5,191,423 | 3/1993 | Yoshia | 348/732 |

FOREIGN PATENT DOCUMENTS

| | | | |
|---|---|---|---|
| 219703 | 6/1982 | European Pat. Off. | H04N 5/44 |
| 2264409 | 8/1993 | United Kingdom | H04N 5/445 |

*Primary Examiner*—Victor R. Kostak
*Assistant Examiner*—Nathan J. Flynn
*Attorney, Agent, or Firm*—Fish & Richardson, P.C.

[57] ABSTRACT

A channel memory device adopted for a television or video cassette recorder and the method therefor, can increase alternatives for channels, cope with the change of broadcasting station names and allow a quick and simple channel selection. The channel memory device includes a tuner for demodulating the broadcasting signal received via antennae, an IF unit for detecting the output signal of tuner, a decoder for decoding the broadcasting data output from IF unit, E$^2$PROM for storing channel data, a luminance and color signal processor for processing the output signals of IF unit and decoder, a microcomputer for controlling the channel selection and channel memory with respect to decoding and tuning the broadcasting data, and a display for displaying the broadcasting data.

3 Claims, 20 Drawing Sheets

FIG.5A

| CP | CHANNEL | BROADCASTING STATION NAME |
|---|---|---|
| 01 | | MBC |
| 02 | | SBS |
| 03 | | KBS1 |
| 04 | | KBS2 |
| 05 | | AFKN |
| ⋮ | ⋮ | ⋮ |

FIG.5B

| CP | CHANNEL NO | BROADCASTING STATION NAME | CP | CHANNEL NO | BROADCASTING STATION NAME |
|---|---|---|---|---|---|
| 01 | | MBC | 01 | 02 | AFKN |
| 02 | | SBS | 02 | 06 | SBS |
| 03 | | KBS1 | 03 | 07 | KBS2 |
| 04 | | KBS2 | 04 | 09 | KBS1 |
| 05 | | AFKN | 05 | 11 | MBC |
| ⋮ | ⋮ | ⋮ | ⋮ | ⋮ | ⋮ |
| CHANNEL REQUIRED BY USER | | | TUNED CHANNEL | | |

FIG.5C

| CP | CHANNEL NO | BROADCASTING STATION NAME | CP | CHANNEL NO | BROADCASTING STATION NAME |
|---|---|---|---|---|---|
| 01 | | MBC | 01 | 11 | MBC |
| 02 | | SBS | 02 | 06 | SBS |
| 03 | | KBS1 | 03 | 09 | KBS1 |
| 04 | | KBS2 | 04 | 07 | KBS2 |
| 05 | | AFKN | 05 | 02 | AFKN |
| ⋮ | ⋮ | ⋮ | ⋮ | ⋮ | ⋮ |
| CHANNEL REQUIRED BY USER | | | SORTED CHANNEL | | |

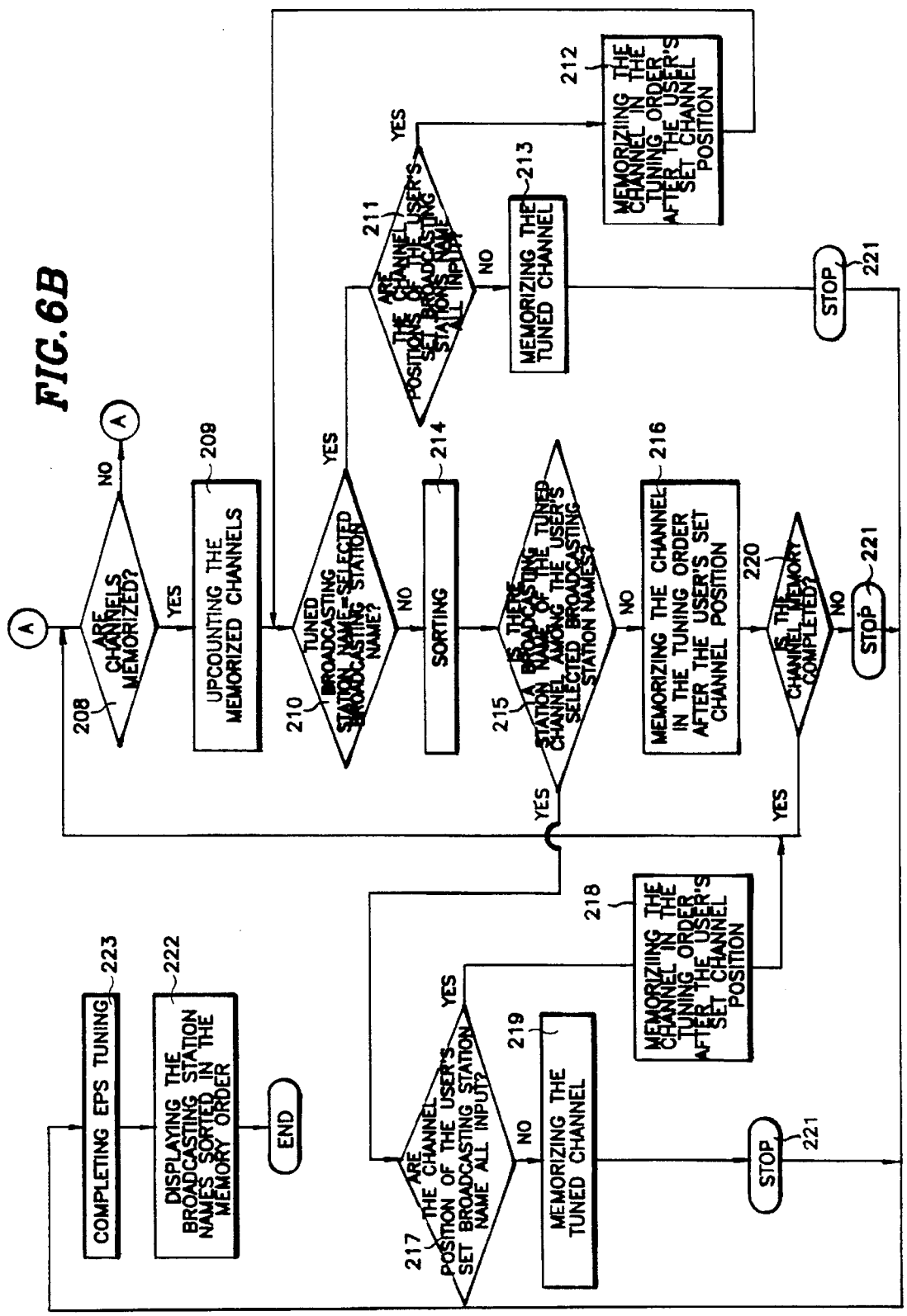

FIG. 7A

| CP | CHANNEL | BROADCASTING STATION NAME |
|---|---|---|
| 01 | | MBC |
| 02 | | AFKN |
| 03 | | KBS1 |
| ⋮ | ⋮ | ⋮ |

FIG. 7B

| CP | CHANNEL NO | BROADCASTING STATION NAME | CP | CHANNEL NO | BROADCASTING STATION NAME |
|---|---|---|---|---|---|
| 01 | | MBC | 01 | 02 | AFKN |
| 02 | | AFKN | 02 | 06 | SBS |
| 03 | | KBS1 | 03 | 07 | KBS2 |
| | | | 04 | 09 | KBS1 |
| | | | 05 | 11 | MBC |
| CHANNEL REQUIRED BY USER | | | TUNED CHANNEL | | |

FIG. 7C

| CP | CHANNEL NO | BROADCASTING STATION NAME | CP | CHANNEL NO | BROADCASTING STATION NAME |
|---|---|---|---|---|---|
| 01 | | MBC | 01 | 11 | MBC |
| 02 | | AFKN | 06 | 02 | AFKN |
| 03 | | KBS1 | 03 | 09 | KBS1 |
| | | | 04 | 06 | SBS |
| | | | 05 | 07 | KBS2 |
| CHANNEL REQUIRED BY USER | | | SORTED CHANNEL | | |

SORTED CHANNEL

NON-SELECTED CHANNEL

FIG. 9A

| CP | CHANNEL NO | BROADCASTING STATION NAME |
|---|---|---|
| 01 | 11 | |
| 02 | 06 | |
| 03 | 09 | |
| 04 | 07 | |
| 05 | 02 | |

FIG. 9B

| CP | CHANNEL NO | BROADCASTING STATION NAME | CP | CHANNEL NO | BROADCASTING STATION NAME |
|---|---|---|---|---|---|
| 01 | 11 | | 01 | 02 | AFKN |
| 02 | 06 | | 02 | 06 | SBS |
| 03 | 09 | | 03 | 07 | KBS2 |
| 04 | 07 | | 04 | 09 | KBS1 |
| 05 | 02 | | 05 | 11 | MBC |
| CHANNEL REQUIRED BY USER | | | TUNED CHANNEL | | |

FIG. 9C

| CP | CHANNEL NO | BROADCASTING STATION NAME | CP | CHANNEL NO | BROADCASTING STATION NAME |
|---|---|---|---|---|---|
| 01 | 11 | | 01 | 11 | MBC |
| 02 | 06 | | 02 | 06 | SBS |
| 03 | 09 | | 03 | 09 | KBS1 |
| 04 | 07 | | 04 | 07 | KBS2 |
| 05 | 02 | | 05 | 02 | AFKN |
| CHANNEL REQUIRED BY USER | | | SORTED CHANNEL | | |

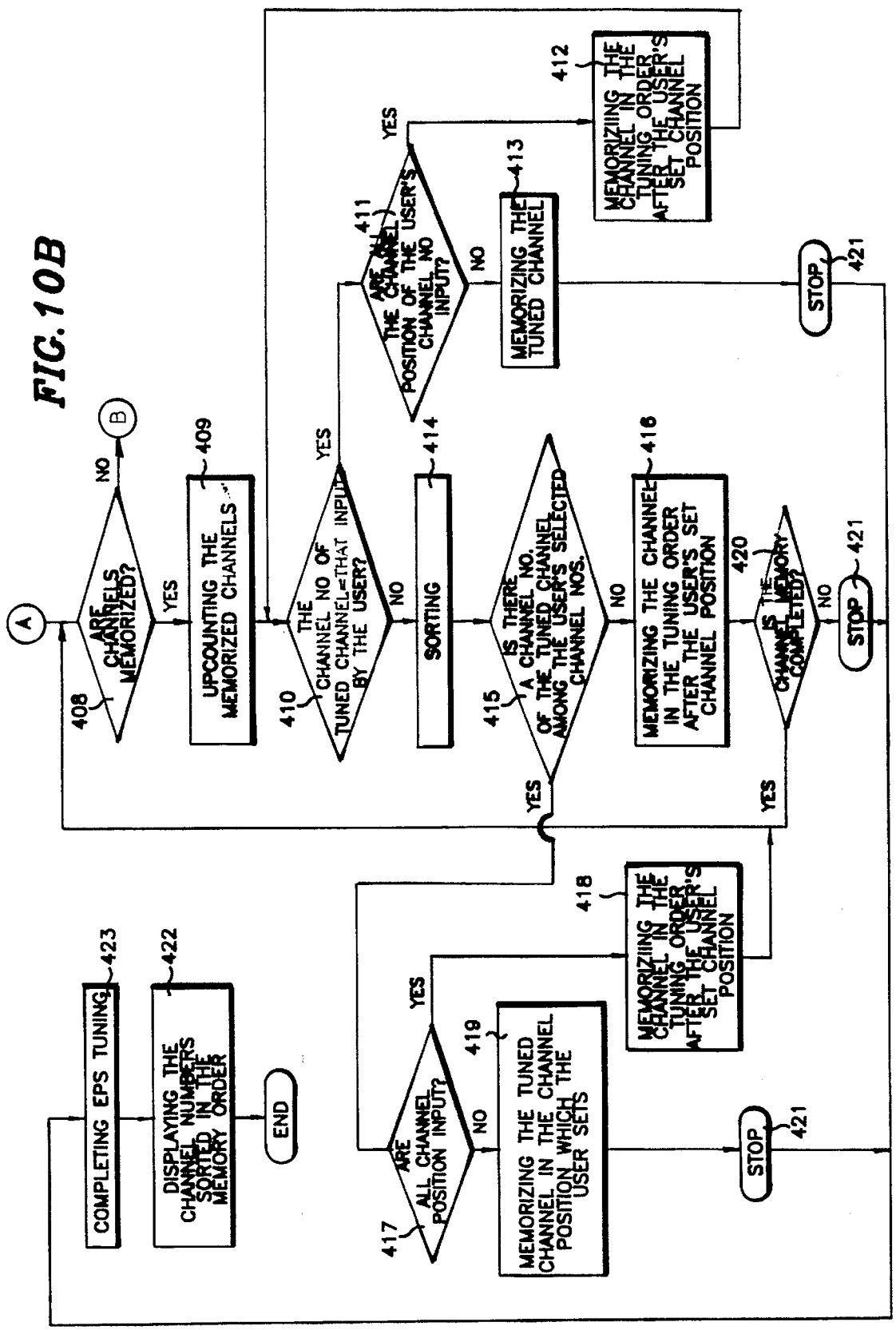

FIG.11A

| CP | CHANNEL NO | BROADCASTING STATION NAME |
|---|---|---|
| 01 | 11 | |
| 02 | 02 | |
| 03 | 09 | |
| ... | ... | |
| ... | ... | |

FIG.11B

| CP | CHANNEL NO | BROADCASTING STATION NAME | CP | CHANNEL NO | BROADCASTING STATION NAME |
|---|---|---|---|---|---|
| 01 | 11 | | 01 | 02 | AFKN |
| 02 | 02 | | 02 | 06 | SBS |
| 03 | 09 | | 03 | 07 | KBS2 |
| | | | 04 | 09 | KBS1 |
| | | | 05 | 11 | MBC |
| CHANNEL REQUIRED BY USER | | | TUNED CHANNEL | | |

FIG.11C

| CP | CHANNEL NO | BROADCASTING STATION NAME | CP | CHANNEL NO | BROADCASTING STATION NAME |
|---|---|---|---|---|---|
| 01 | 11 | | 01 | 11 | MBC |
| 02 | 02 | | 02 | 02 | AFKN |
| 03 | 09 | | 03 | 09 | KBS1 |
| | | | 04 | 06 | SBS |
| | | | 05 | 07 | KBS2 |
| CHANNEL REQUIRED BY USER | | | SORTED CHANNEL | | |

SORTED CHANNEL (rows 01–03)
NON-SELECTED CHANNEL (rows 04–05)

FIG.13A

| CHANNEL NO | BROADCASTING STATION NAME | CP |
|---|---|---|
| 02 | AFKN | |
| 06 | SBS | |
| 07 | KBS2 | |
| 09 | KBS1 | |
| 11 | MBC | |
| ... | ... | ... |
| 04 | TBC | |

FIG.13B

| CHANNEL NO | BROADCASTING STATION NAME | CP |
|---|---|---|
| 02 | AFKN | 05 |
| 06 | SBS | 02 |
| 07 | KBS2 | 04 |
| 09 | KBS1 | 03 |
| 11 | MBC | 01 |
| ... | ... | ... |

FIG.13C

| CHANNEL NO | BROADCASTING STATION NAME | CP | CP | CHANNEL NO | BROADCASTING STATION NAME |
|---|---|---|---|---|---|
| 11 | MBC | 01 | 01 | 02 | AFKN |
| 06 | SBS | 02 | 02 | 06 | SBS |
| 09 | KBS1 | 03 | 03 | 07 | KBS2 |
| 07 | KBS2 | 04 | 04 | 09 | KBS1 |
| 02 | AFKN | 05 | 05 | 11 | MBC |
| DATA IN ACCORDANCE WITH CP RECORDED BY MICROCOMPUTER | | | TUNED CHANNEL DATA | | |

FIG.13D

| CHANNEL NO | BROADCASTING STATION NAME | CP | CP | CHANNEL NO | BROADCASTING STATION NAME |
|---|---|---|---|---|---|
| 11 | MBC | 01 | 01 | 11 | MBC |
| 06 | SBS | 02 | 02 | 06 | SBS |
| 09 | KBS1 | 03 | 03 | 09 | KBS |
| 07 | KBS2 | 04 | 04 | 07 | KBS2 |
| 02 | AFKN | 05 | 05 | 02 | AFKN |
| CHANNEL REQUIRED BY USER | | | SORTED CHANNEL | | |

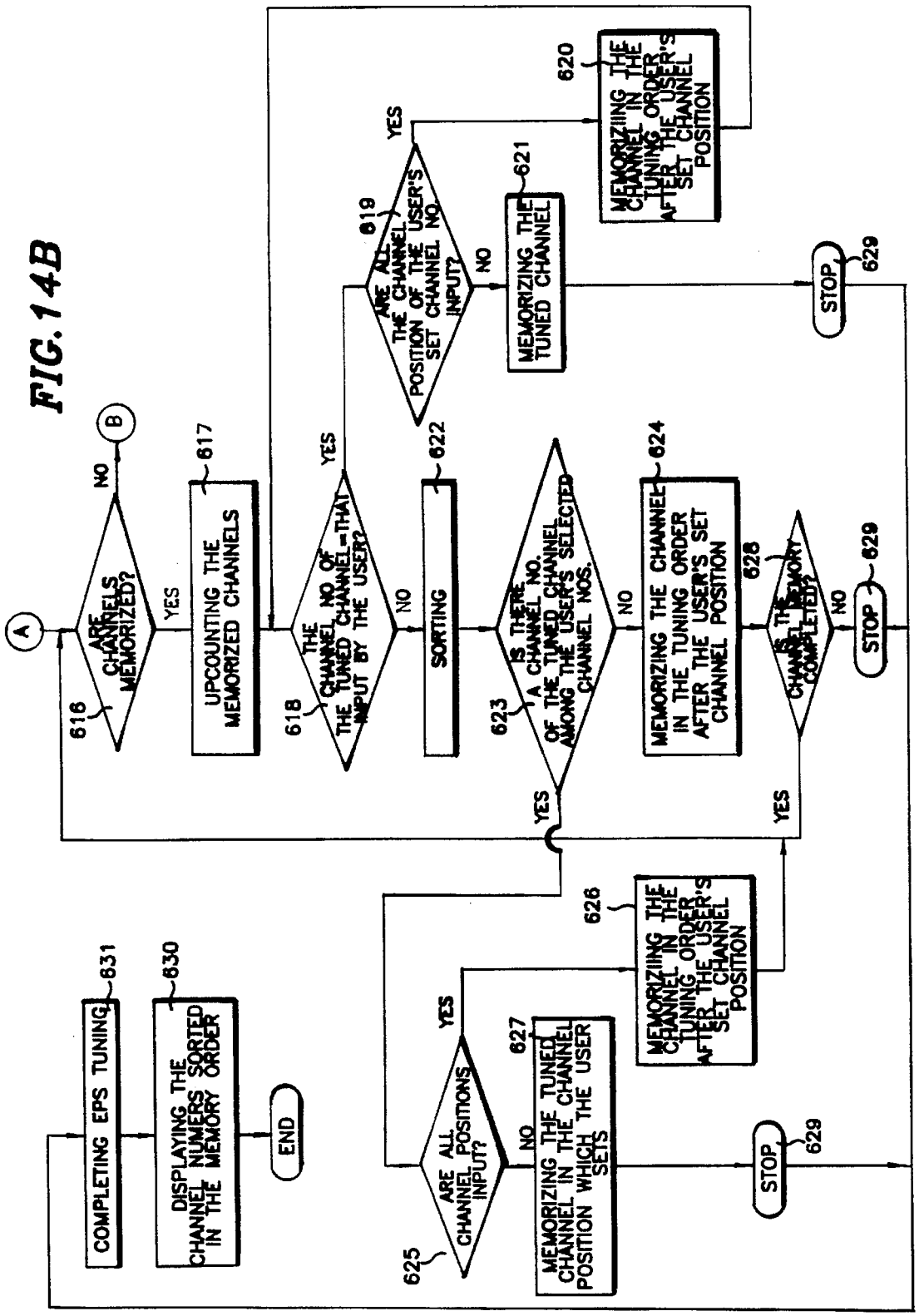

FIG.15A

| CHANNEL NO | BROADCASTING STATION NAME | CP |
|---|---|---|
| 02 | AFKN | |
| 06 | SBS | |
| 07 | KBS2 | |
| 09 | KBS1 | |
| 11 | MBC | |

FIG.15B

| CHANNEL NO | BROADCASTING STATION NAME | CP |
|---|---|---|
| 02 | AFKN | 02 |
| 06 | SBS | |
| 07 | KBS2 | |
| 09 | KBS1 | 03 |
| 11 | MBC | 01 |

FIG.15C

| CHANNEL NO | BROADCASTING STATION NAME | CP | CP | CHANNEL NO | BROADCASTING STATION NAME |
|---|---|---|---|---|---|
| 11 | MBC | 01 | 01 | 02 | AFKN |
| 02 | AFKN | 02 | 02 | 06 | SBS |
| 07 | KBS2 | 03 | 03 | 07 | KBS2 |
| | | | 04 | 09 | KBS1 |
| | | | 05 | 11 | MBC |
| DATA IN ACCORDANCE WITH CP RECORDED BY MICROCOMPUTER ||| TUNED CHANNEL DATA |||

FIG.15D

| CHANNEL NO | BROADCASTING STATION NAME | CP | CP | CHANNEL NO | BROADCASTING STATION NAME |
|---|---|---|---|---|---|
| 11 | MBC | 01 | 01 | 11 | MBC |
| 02 | AFKN | 02 | 02 | 02 | AFKN |
| 07 | KBS2 | 03 | 03 | 07 | KBS2 |
| | | | 04 | 06 | SBS |
| | | | 05 | 09 | KBS1 |

} SELECTED CHANNEL
} NON-SELECTED CHANNEL

METHOD FOR CHANNEL SELECTION AND TUNING BASED UPON SET CHANNEL POSITIONS

BACKGROUND OF THE INVENTION

The present invention relates to a channel memory device adapted for a television or video cassette recorder, and more particularly, to a channel memory device which can perform a tuning following the order in which a user sets his desired channels sequentially, and performs an automatic memory, and the method therefor.

Conventionally, there are two types of channel memory methods; one is a channel memory method using an on screen display (OSD) and the other is a channel memory method using a text, e.g., an automatic channel memory system (ACMS) plus. The former performs a tuning and channel memory by selecting a tuning mode such as an easy programming search (EPS) or manual programming search (MPS).

According to the EPS method, channels are stored in memory in the tuning order starting from channel positions by tuning broadcasting signals sequentially from $V_L$ band to UHF band in an EPS selection. According to the MPS method, only the channel which the user desires to see is searched, irrespective of bands, and channel positions are changed at the user's option. That is to say, user's desired channels are tuned sequentially for memory.

Meanwhile, according to the ACMS plus method which is the most up-to-date method, the information on broadcasting stations is analyzed using a text to then be displayed. There are provided several tables showing broadcasting stations listed in different order, respectively, as described in FIG. 1. The user selects one table and broadcasting stations on the selected table are sorted by microcomputer for memorizing channels.

The ACMS plus method will now be described with reference to FIG. 2.

A broadcasting signal received via antennae 1 is modulated to then be applied to a tuner 2. The signal is converted into an intermediate frequency (IF) signal in tuner 2 by an upper heterdine method to then be input to an IF unit 3.

The IF signal input to IF unit 3 passes through a bandpass filter (not shown) for filtering a video, color or audio and then video and audio are detected to then be input to a video program by teletext (VPT) 4.

VPT 4 detects the information on a video program system (VPS) transmitted by a broadcasting station, time, station name and the like to then superimpose or display on a background color, e.g., blue or green. The channels memorized by EPS or MPS method are displayed for each channel and the station name is also is displayed.

Luminance and color signal processor 5 records broadcasting signals or sends them to a line or modulator to then be viewed.

Also, in order to arrange sequentially memorized channels in the user's desired order, the ACMS plus method has been proposed. As described in FIG. 1, if the user selects one among several channel tables provided in accordance with area codes, a microcomputer 5 sorts the tuned memory channels so as to match with the selected table and controls to be displayed.

However, the conventional channel memory method has a selection limit in that channels are changed only in the order shown in the channel table. After automatic tuning, channel positions should be selected to change. Also, if the number of CATV companies are increased or the name of the broadcasting station is changed like in Europe where broadcasting services are frequently, the proper action is not possible.

SUMMARY OF THE INVENTION

It is an object of the present invention to provide a channel memory device which can increase alternative arrangements of channels, cope with the change of broadcasting station name and allow a simple and quick selection of channels, and the method therefor.

BRIEF DESCRIPTION OF THE DRAWINGS

The above objects and advantages of the present invention will become more apparent by describing in detail a preferred embodiment thereof with reference to the attached drawings in which:

FIGS. 4A, 4B, 6A, 6B, 8A, 8B, 10A, 10B, 12A, 12B, 14A, and 14B are flowcharts showing embodiments of the present invention; and FIGS. 5A, 5B, 5C, 7A, 7B, 7C, 9A, 9B, 9C, 11A, 11B, 11C, 13A, 13B, 13C, 13D, 15A, 15B, 15C and 15D are channel memory tables according to embodiments of the present invention.

DETAILED DESCRIPTION OF THE INVENTION

Figure 1:
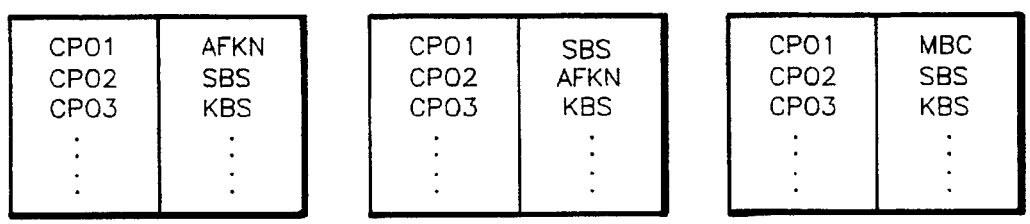
FIG. 1 contains conventional channel memory tables.
Figure 2:
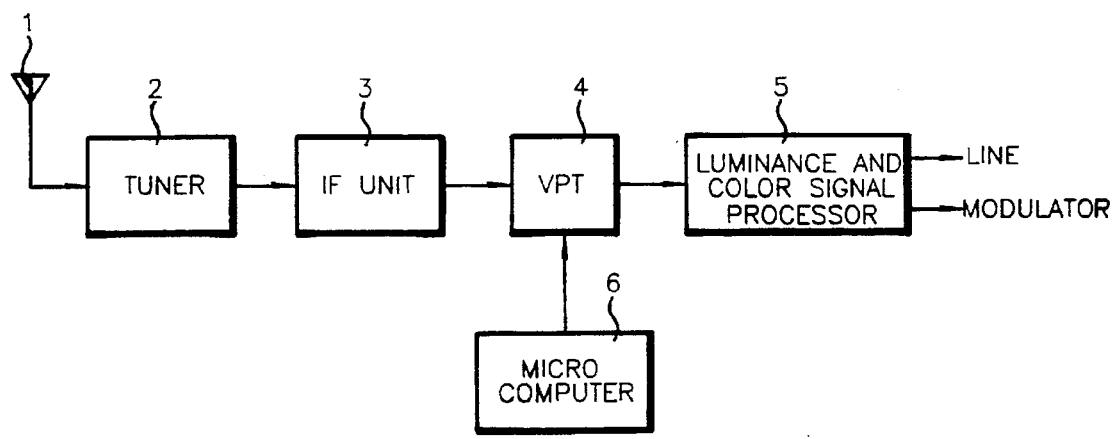
FIG. 2 is a block diagram of the hardware according to the conventional technology.
Figure 3:
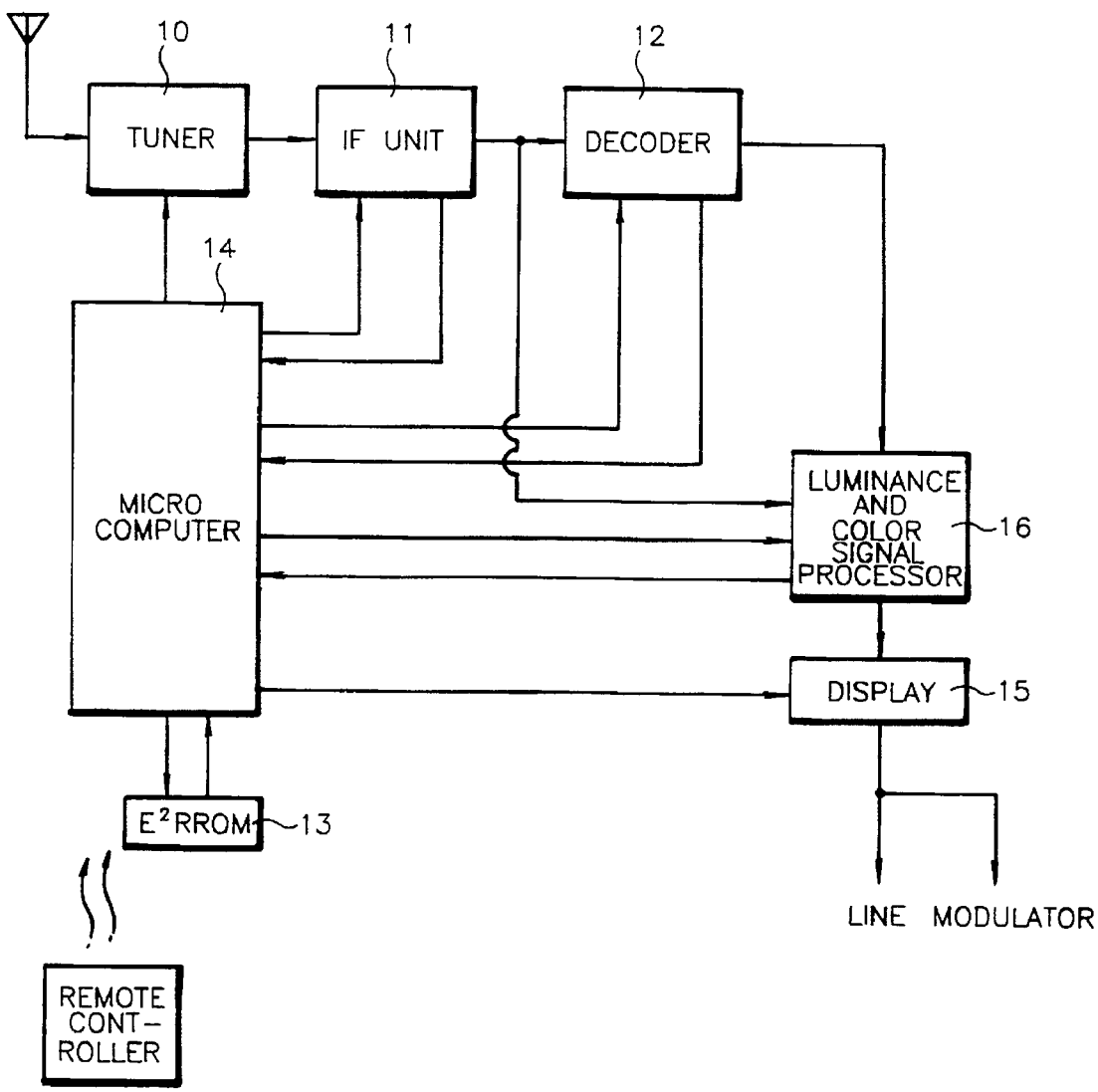
FIG. 3 is a block diagram of the hardware according to the present invention.

Referring to FIG. 3, an automatic channel memory device according to the present invention is constituted by a tuner 10 for demodulating the broadcasting signal received via antennae, an IF unit 11 for detecting the output signal of tuner 10, a decoder 12 for decoding the broadcasting data output from IF unit 11, $E^2PROM$ 13 for storing channel data, a luminance and color signal processor 16 for processing the output signals of IF unit 11 and decoder 12, a microcomputer 14 for controlling the channel selection and channel memory with respect to decoding and tuning the broadcasting data, and a display 15 for displaying the broadcasting data.

Figure 4A:
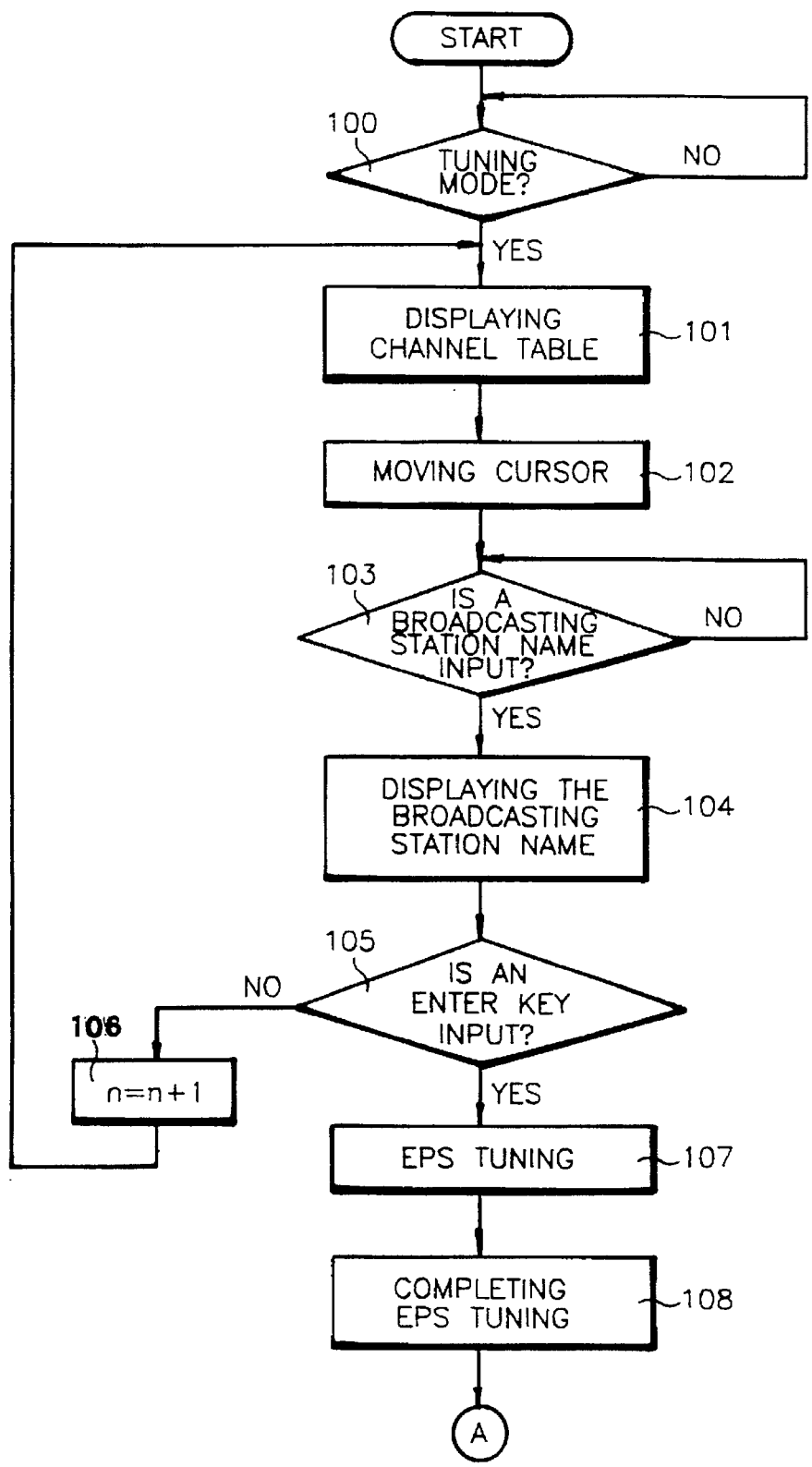
Figure 4B:
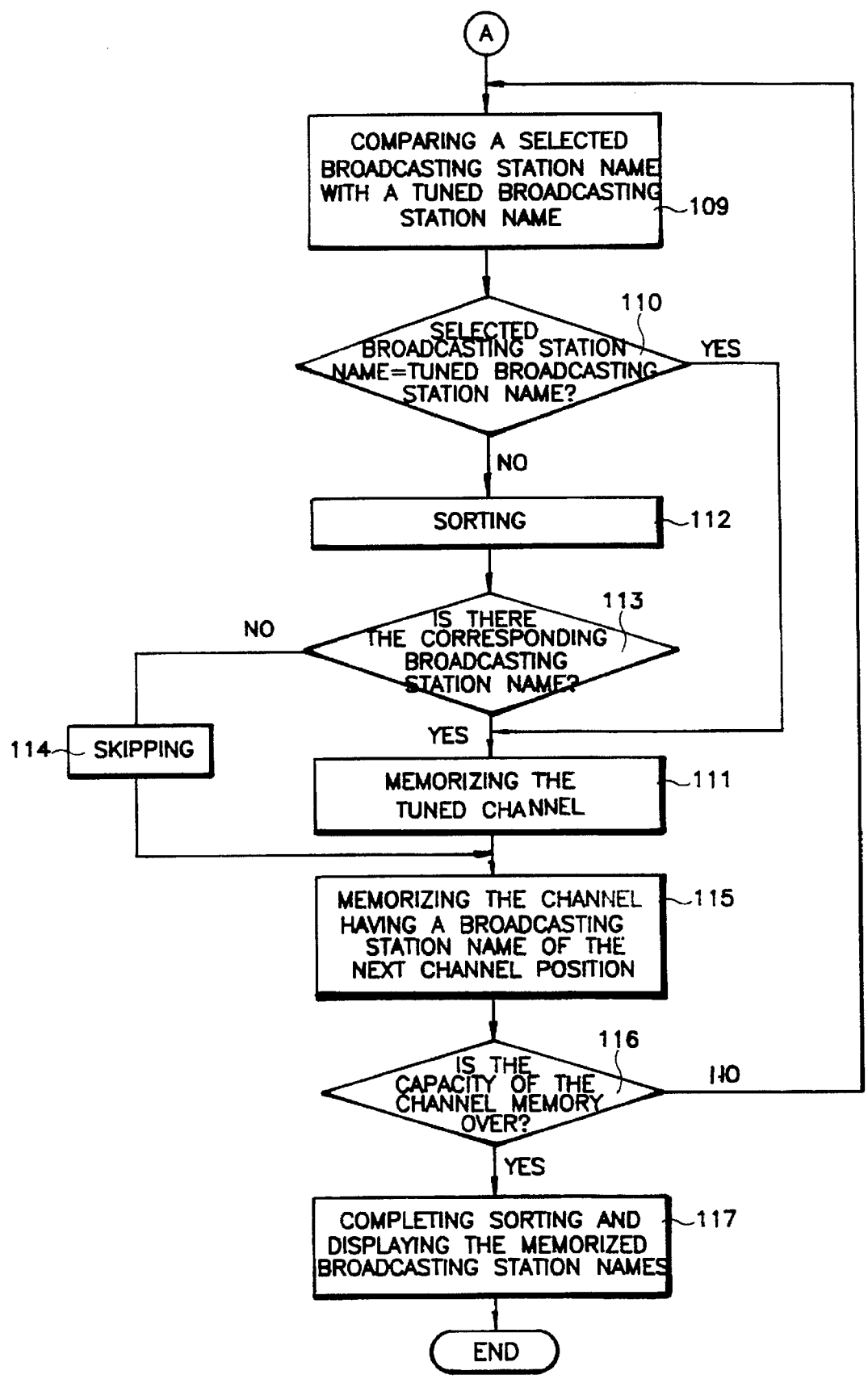

FIG. 4 shows the automatic channel memory control method according to a first embodiment of the present invention, which will be described hereinbelow.

First, setting a tuning mode is controlled by an OSD or remote controller. If the tuning mode is set (step 100), display 15 is controlled using OSD or VPT so that microcomputer 14 selects a broadcasting station name, to thereby display channel table (step 101), and a cursor is moved into a position where the broadcasting station name is input (step 102).

A user inputs a broadcasting station name by means of remote controller (step 103) to then be displayed (step 104). It is detected whether an enter key is input or not (step 105). If there is no input of enter key, it is determined by microcomputer 14 that the input of the first channel position $CP_1$ is completed, and then, the input of the next channel position $CP_2$ is waited (step 106). If user's desired channels are all input by the aforementioned processes as shown in FIG. 5A and then the enter key is pressed by the user, it is determined by microcomputer 14 that channel setting is completed, and then EPS tuning is performed (step 107).

If the EPS tuning is completed (step 108), microcomputer 14 detects the broadcasting station name from decoder 12 and compares it with that input in step 103 (step. 109). If the names of the user's selected broadcasting station and the tuned broadcasting station are the same (step 110), the broadcasting station name is stored in E²PROM 13 (step 111). If the names are not the same, microcomputer 14 sorts for searching the same broadcasting station name (step 112). If there is the corresponding broadcasting station name (step 113), the tuned channel is memorized in the user's set channel position (step 111). If there is no corresponding broadcasting station name, skipping is performed (step 114). Thereafter, the channel having a broadcasting station name of the next channel position is memorized by the above processes (step 115) (see FIG. 5C). The user can memorize channels depending on the capacity of the channel memory (step 116) and microcomputer 14 sorts broadcasting station names. After sorting, in order to confirm whether the broadcasting station names are sorted in the user's desired order, the memorized broadcasting station names are displayed (step 117), thereby completing the sorting.

Figure 6A:
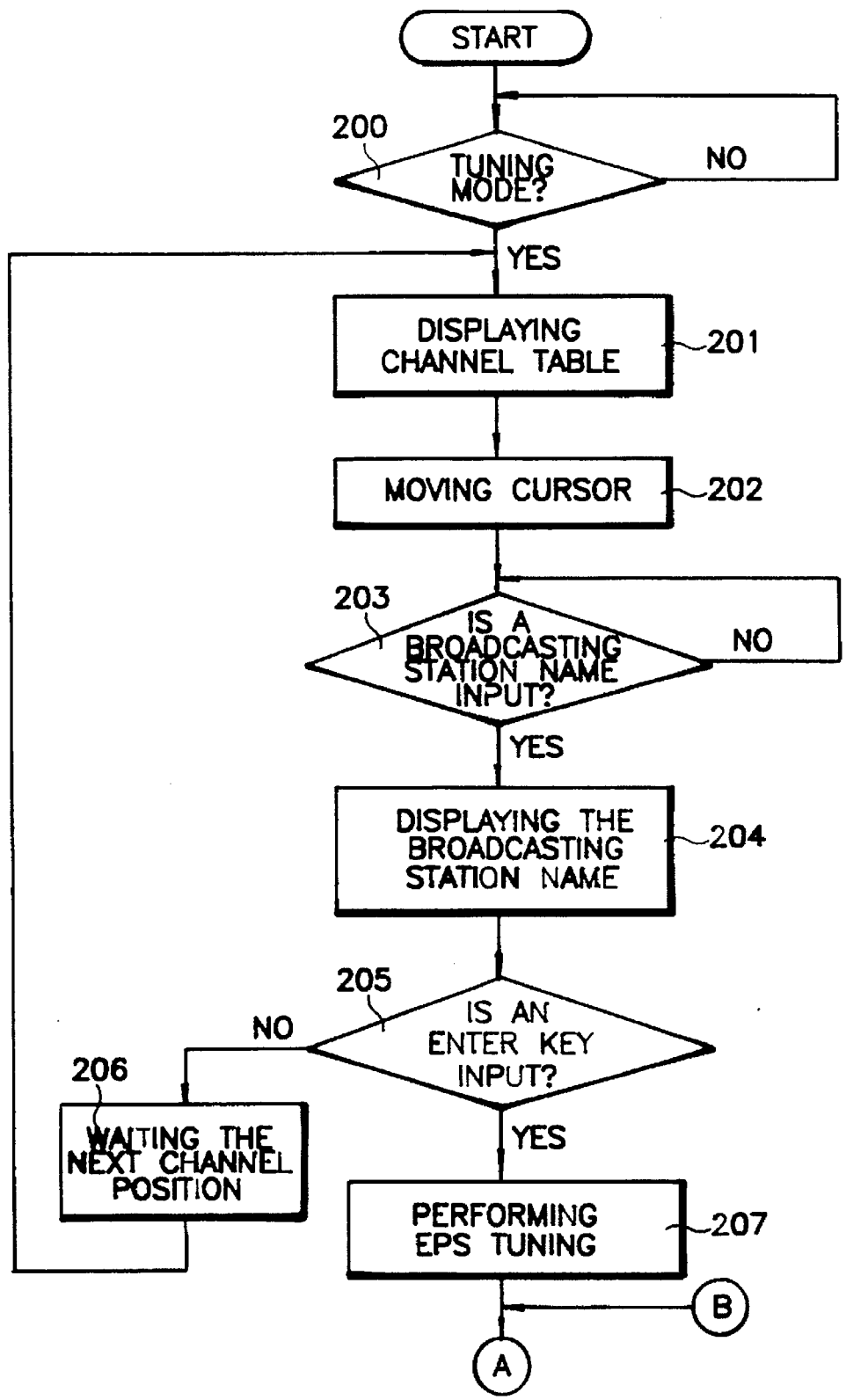

FIG. 6 shows the automatic channel memory control method according to a second embodiment of the present invention, which will be described hereinbelow.

First, setting a tuning mode is controlled by an OSD or remote controller. If the tuning mode is set (step 200), display 15 is controlled using OSD or VPT so that microcomputer 14 selects a broadcasting station name, to thereby display channel table (step 201), and a cursor is moved into a position where the broadcasting station name is input (step 202).

A user inputs a broadcasting station name by means of remote controller (step 203) to then be displayed (step 204). It is detected whether an enter key is input or not (step 205). If there is no input of enter key, it is determined by microcomputer 14 that the input of the first channel position $CP_1$ is completed, and then, the input of the next channel position $CP_2$ is waited (step 206). If user's desired channels are all input by the aforementioned processes as shown in FIG. 7A and then the enter key is pressed by the user, it is determined by microcomputer 14 that channel setting is completed, and then EPS tuning is performed (step 207). Thereafter, it is confirmed that channels are memorized (step 208). If the channels are not memorized, waiting is continued until the channels are tuned. Then, if the channels are memorized, the memorized channels are upcounted (step 209). Thereafter, the broadcasting station name of the channel being tuned is compared with that input by the user in step 203 (step 210) (see FIG. 7B). If they are the same, it is detected whether the channel positions of the user's set broadcasting station names are all input or not (step 211).

If all channel positions are input in step 211, the channel is memorized in the tuning order after the user's set channel position (step 212). If not input, the tuned channel is memorized in the channel position which the user sets (step 213).

If the broadcasting station name of the channel being tuned in step 210 and that selected by the user are not the same, sorting is performed to confirm whether there is a broadcasting station name of the tuned channel, among the user's selected broadcasting station names (step 214). If there is no same broadcasting station name (step 215), the channel is memorized in the tuning order after the user's set channel position (step 216). If there is the same broadcasting station name (step 215), it is detected whether the channel positions of the user's set broadcasting station names are all input or not (step 217).

If all channel positions are input in step 217, the channel is memorized in the tuning order after the user's set channel position (step 218). If not input, the tuned channel is memorized in the channel position which the user sets (step 219).

While upcounting by one (step 209), the above processes are repeatedly performed (step 220). Thereafter, if the channel memory is completed (step 221) (see FIG. 7C), microcomputer 14 displays the broadcasting station names sorted in the memory order on OSD or live screen (step 222). At this time, tuning is completed at the same time when the channel memory is completed (step 223).

Figure 8A:
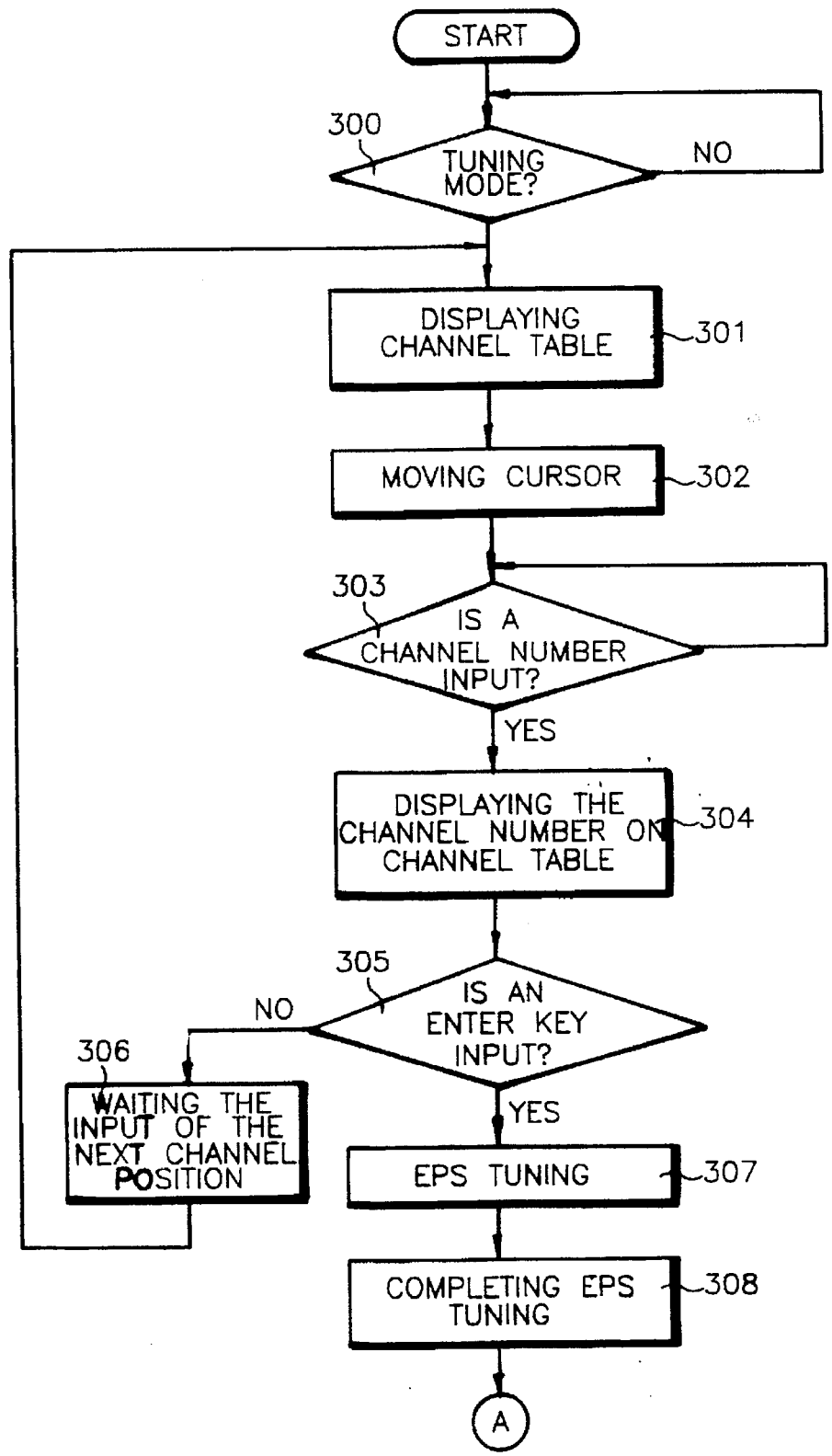
Figure 8B:
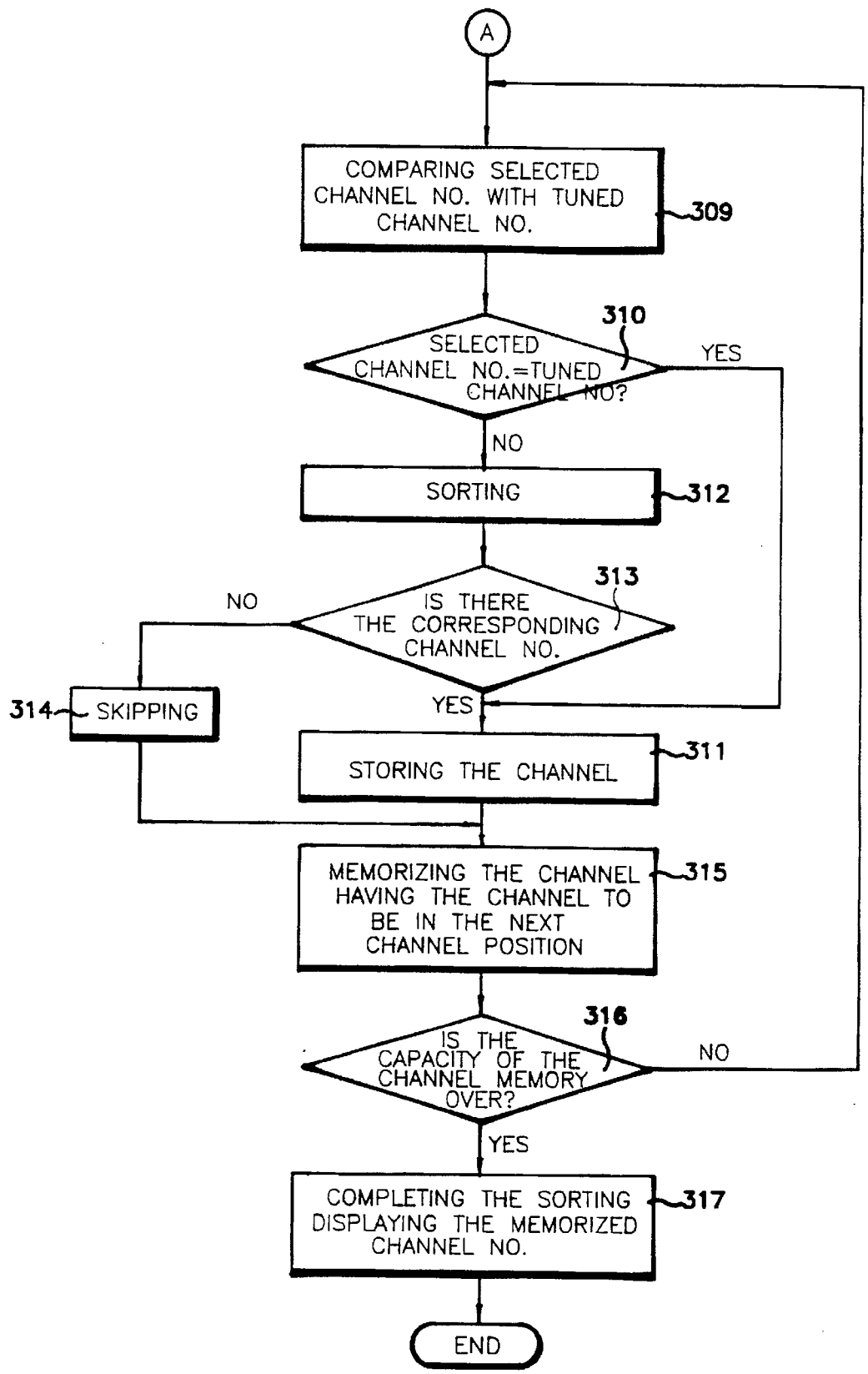

FIG. 8 shows the automatic channel memory control method according to a third embodiment of the present invention, which will be described hereinbelow.

First, setting a tuning mode is controlled by an OSD or remote controller. If the tuning mode is set (step 300), display 15 is controlled using OSD or VPT so that microcomputer 14 selects a channel number, to thereby display channel table (step 301), and a cursor is moved into a position where the channel number is input (step 302).

A user inputs a channel number by means of remote controller (step 303) to then be displayed (step 304). It is detected whether an enter key is input or not (step 305). If there is no input of the enter key, it is determined by microcomputer 14 that the input of the first channel position $CP_1$ is completed, and then, the input of the next channel position $CP_2$ is waited (step 306). If user's desired channels are all input by the above processes as shown in FIG. 9A and then the enter key is pressed by the user, it is determined by microcomputer 14 that channel setting is completed, and then EPS tuning is performed (step 307).

If the EPS tuning is completed (step 308), microcomputer 14 detects the channel number from decoder 12 and compares it with that input in step 303 (step 309) (see FIG. 9B). If the number of the user's selected channel and that of the tuned channel are the same (step 310), the channel is stored in E²PROM 13 (step 311). If the names are not the same, microcomputer 14 sorts for searching the same channel number (step 312). If there is the corresponding channel number (step 313), the tuned channel having the channel number is memorized in the user's set channel position (step 311). If there is no corresponding channel number, skipping is performed (step 314). Thereafter, the channel having the channel to be in the next channel position is memorized by the above processes (step 315) (see FIG. 9C). The user can memorize channels depending on the capacity of the channel memory (step 316) and microcomputer 14 sorts channel numbers depending on the capacity. After sorting, in order to confirm whether the channel numbers are sorted in the user's desired order, the memorized channel numbers are displayed (step 317), thereby completing the sorting.

Many broadcasting stations are newly established and the names of broadcasting stations are often changed in the area where CATVs are well developed, e.g., European countries. If the name of a broadcasting station is changed, the changed name of the broadcasting station is not memorized in microcomputer. However, in such a case, according to such a channel number selection method as described in the third embodiment of the present invention, if the user selects a channel, the information on the changed name of the broadcasting station can be obtained using a VPT.

Figure 10A:
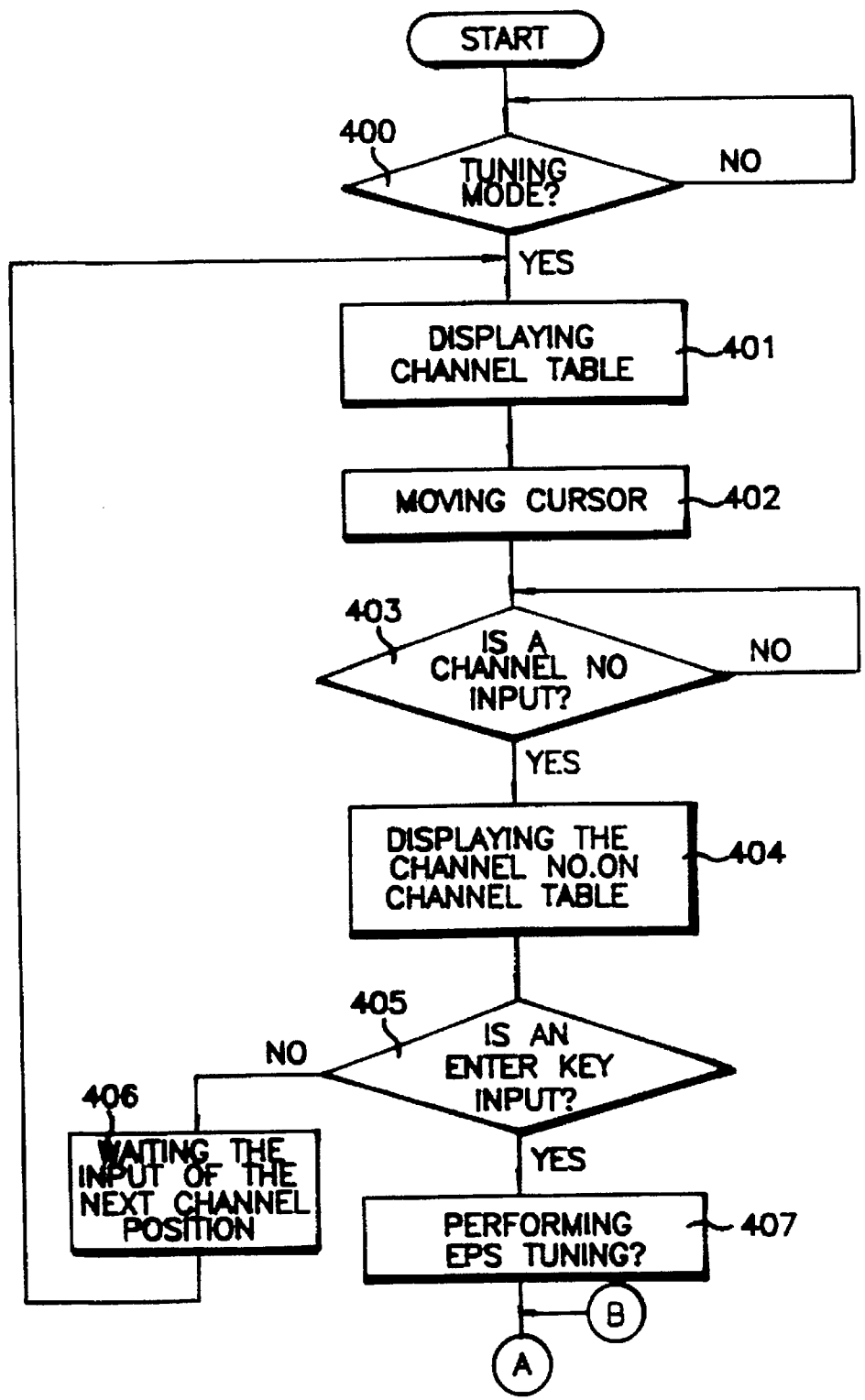

FIG. 10 shows the automatic channel memory control method according to a fourth embodiment of the present invention, which will be described hereinbelow.

First, setting a tuning mode is controlled by an OSD or remote controller. If the tuning mode is set (step 400), display 15 is controlled using OSD or VPT so that microcomputer 14 selects a channel number, to thereby display channel table (step 401), and a cursor is moved into a position where the channel number is input (step 402).

A user inputs the channel number by means of remote controller (step 403) to then be displayed (step 404). It is detected whether an enter key is input or not (step 405). If there is no input of the enter key, it is determined by microcomputer 14 that the input of the first channel position $CP_1$ is completed, and then, the input of the next channel position $CP_2$ is waited (step 406). If user's desired channels are all input by the above processes as shown in FIG. 11A and then the enter key is pressed by the user, it is determined by microcomputer 14 that channel setting is completed, and then EPS tuning is performed (step 407).

Thereafter, it is confirmed that channels are memorized (step 408). If the channels are not memorized, waiting is continued until the channels are tuned. Then, if the channels are memorized, the memorized channels are upcounted (step 409). Then, the channel number of the channel being tuned is compared with that input by the user in step 403 (step 410) (see FIG. 11B). If they are the same, it is detected whether the channel positions of the user's set channel number are all input or not (step 411).

If all channel positions are input in step 411, the channel is memorized in the tuning order after the user's set channel position (step 412). If not input, the tuned channel is memorized in the channel position which the user sets (step 413).

If the channel number of the channel being tuned in step 410 and that selected by the user are not the same, sorting is performed to confirm whether there is a channel number of the tuned channel, among the user's selected channel numbers (step 414). If there is no same channel number (step 415), the channel is memorized in the tuning order after the user's set channel position (step 416). If there is the same broadcasting station name (step 415), it is detected whether the channel positions of the user's set channel number are all input or not (step 417).

If all channel positions are input in step 417, the channel is memorized in the tuning order after the user's set channel position (step 418). If not input, the tuned channel is memorized in the channel position which the user sets (step 419).

While upcounting by one (step 409), the above processes are repeatedly performed (step 420). Thereafter, if the channel memory is completed (step 421) (see FIG. 10C), microcomputer 14 displays the channel numbers sorted in the memory order on OSD or live screen (step 422). At this time, tuning is completed at the same time when the channel memory is completed (step 423).

Figure 12A:
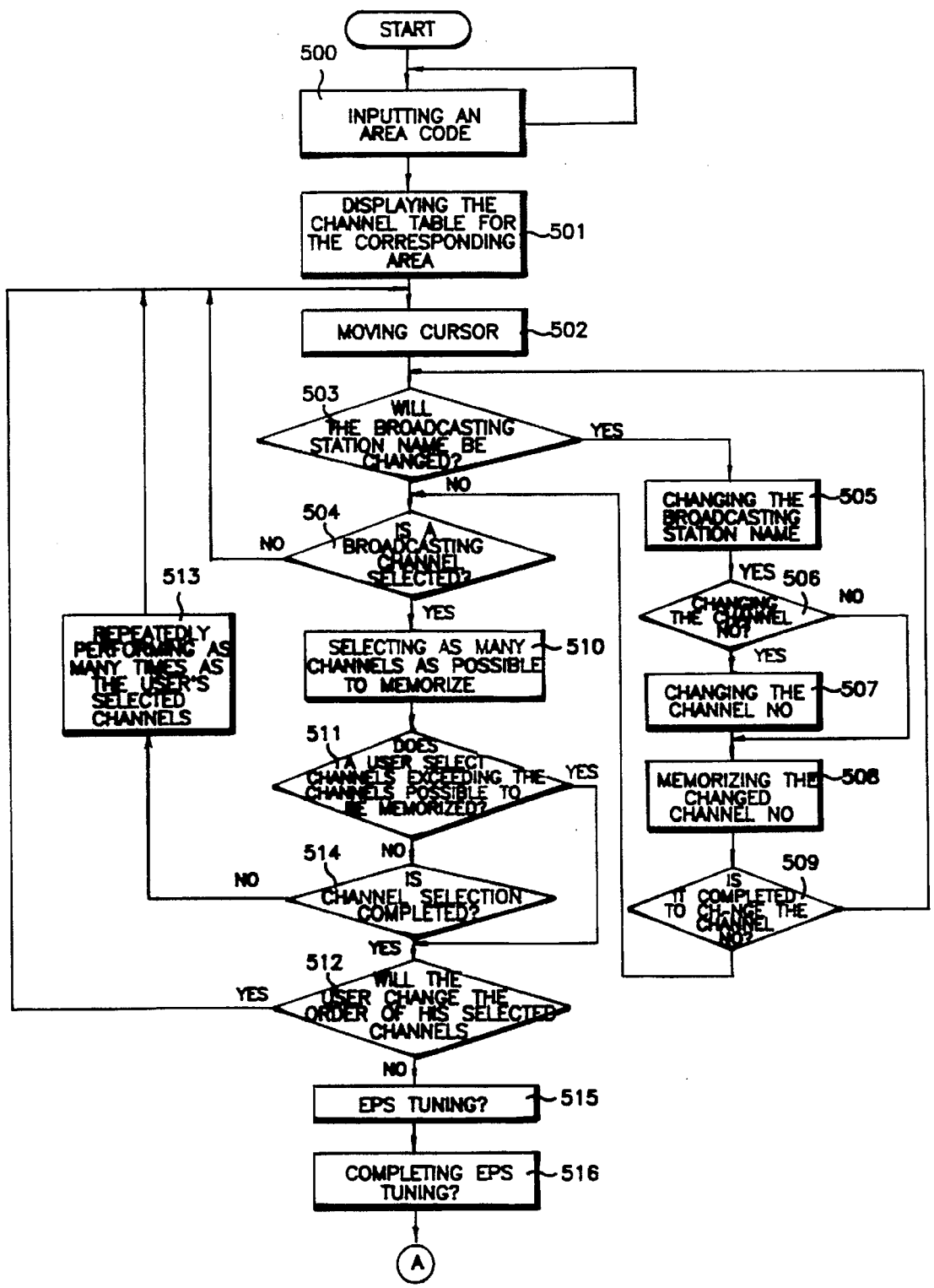
Figure 12B:
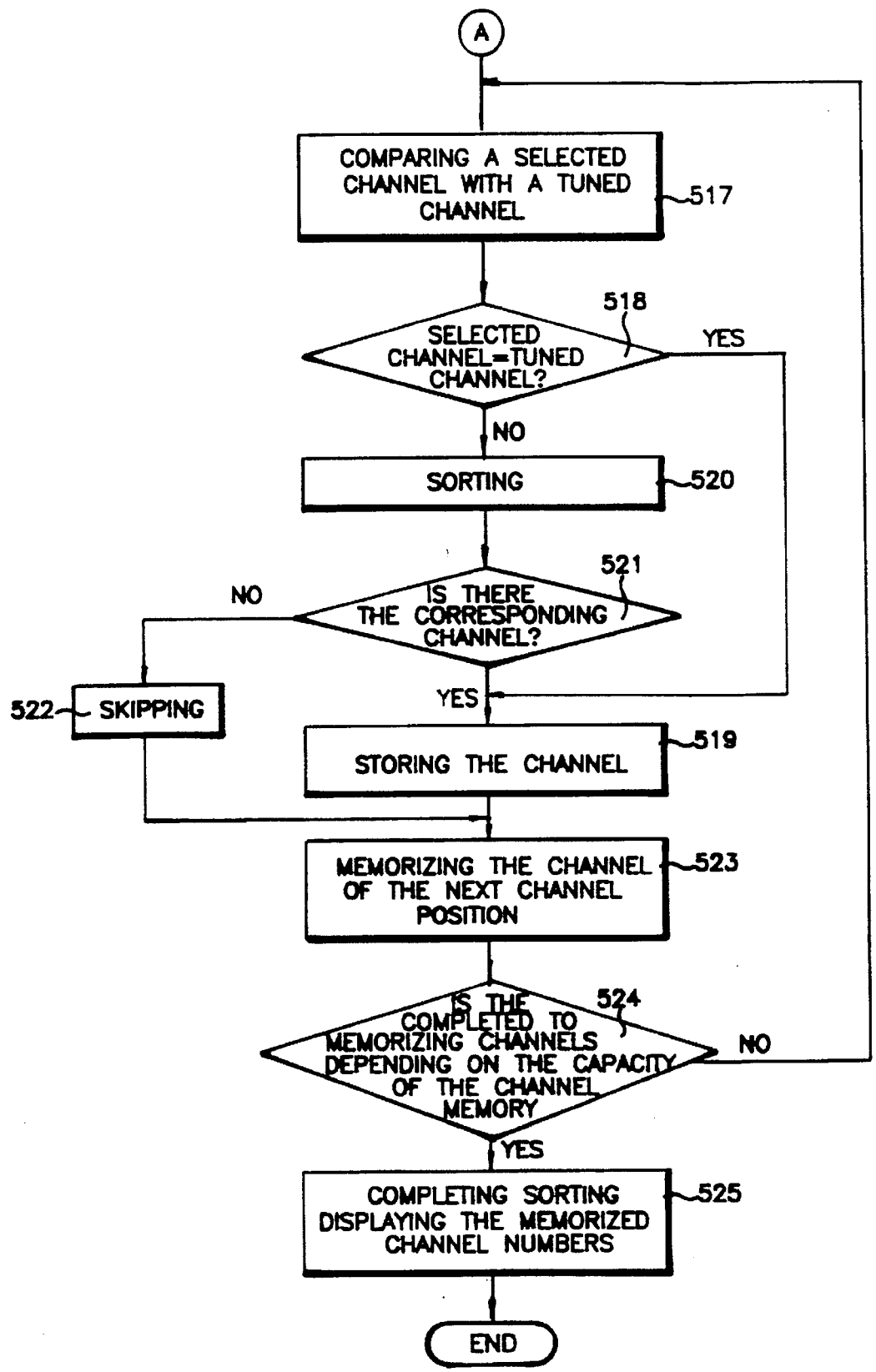

FIG. 12 shows the automatic channel memory control method according to a fifth embodiment of the present invention, which will be described hereinbelow.

Microcomputer 14 stores the broadcasting data on the cities and local areas of a nation, e.g., the channel number for the Munhwa Broadcasting Corporation (MBC) in Seoul is 11 and that for Kyungnam MBC is 13. If an area code is input (step 500), the channel table for the corresponding area is controlled to be displayed in display 15 (step 501) so that the user can select his desired channel viewing the displayed channel table.

When the user selects a channel, he views the channel table which channel data, i.e., channel number or broadcasting station name, are listed therein, as shown in FIG. 13A. By using a remote controller, up/down keys or arrow keys (step 502), the user selects his desired channel (step 504) (see FIG. 13B). Prior to the user's selection of channel, microcomputer 14 detects whether the user will change the broadcasting station name or channel number (step 503).

Step 503 is a provision for the case when channel number or broadcasting station name is changed by the establishment of CATVs or satellite broadcasting systems.

If a broadcasting station name is changed (step 505), channel number can also be changed (step 506). If the channel number is changed (step 507), the changed channel number is memorized (step 508). If the changed items are added, the above processes are repeatedly performed (step 509), thereby changing channel number or broadcasting station name.

If a broadcasting channel is selected in step 504, a broadcasting signal received via antennae is detected in IF unit 11 as a video signal to then be memorized in $E^2PROM$ 13 for each channel position. The user can selects as many channels (n=40) as possible to memorize in $E^2PROM$ 13 and some users may select less channels than that (step 510).

If a user selects channels exceeding the channels possible to be memorized in $E^2PROM$ 13 (step 511), the user is questioned by microcomputer 14 whether he will change the order of his selected channels (step 512). If he will change, only with respect to the channels to be changed, the above processes following step 502 are performed again.

Those processes are repeatedly performed as many times as the user's selected channels (step 513). If channel selection is completed (step 514), microcomputer 14 performs step 512 again. Then, if there is no further channel to be changed, EPS tuning is performed (step 515).

If the EPS tuning is completed (step 516), microcomputer 14 detects the channel from decoder 12 and compares it with the input channel (step 517). If the user's selected channel and the tuned channel are the same (step 518), the channel is stored in $E^2PROM$ 13 (step 519). If the names are not the same, microcomputer 14 sorts for searching the same channel (step 520). If there is the corresponding channel (step 521), the tuned channel is memorized in the user's selected channel position (step 519). If there is no corresponding channel, skipping is performed (step 522).

Thereafter, the channel of the next channel position is memorized through the above processes (step 523). The user can memorize channels depending on the capacity of the channel memory (step 524) and microcomputer 14 sorts channel numbers depending on the capacity (FIG. 13D).

After sorting, in order to confirm whether the channel numbers are sorted in the user's desired order, the memorized channel numbers are displayed (step 525), thereby completing the sorting.

According to the aforementioned fifth embodiment of the present invention, the user can edit the data corresponding to the broadcasting channel and broadcasting station name when a CATV broadcasting system is newly established or closed, and select his desired channel easily only by moving a cursor without recording channel number or broadcasting station name directly, thereby non-selected channels are skipped and the user can see only his desired channel.

Figure 14A:
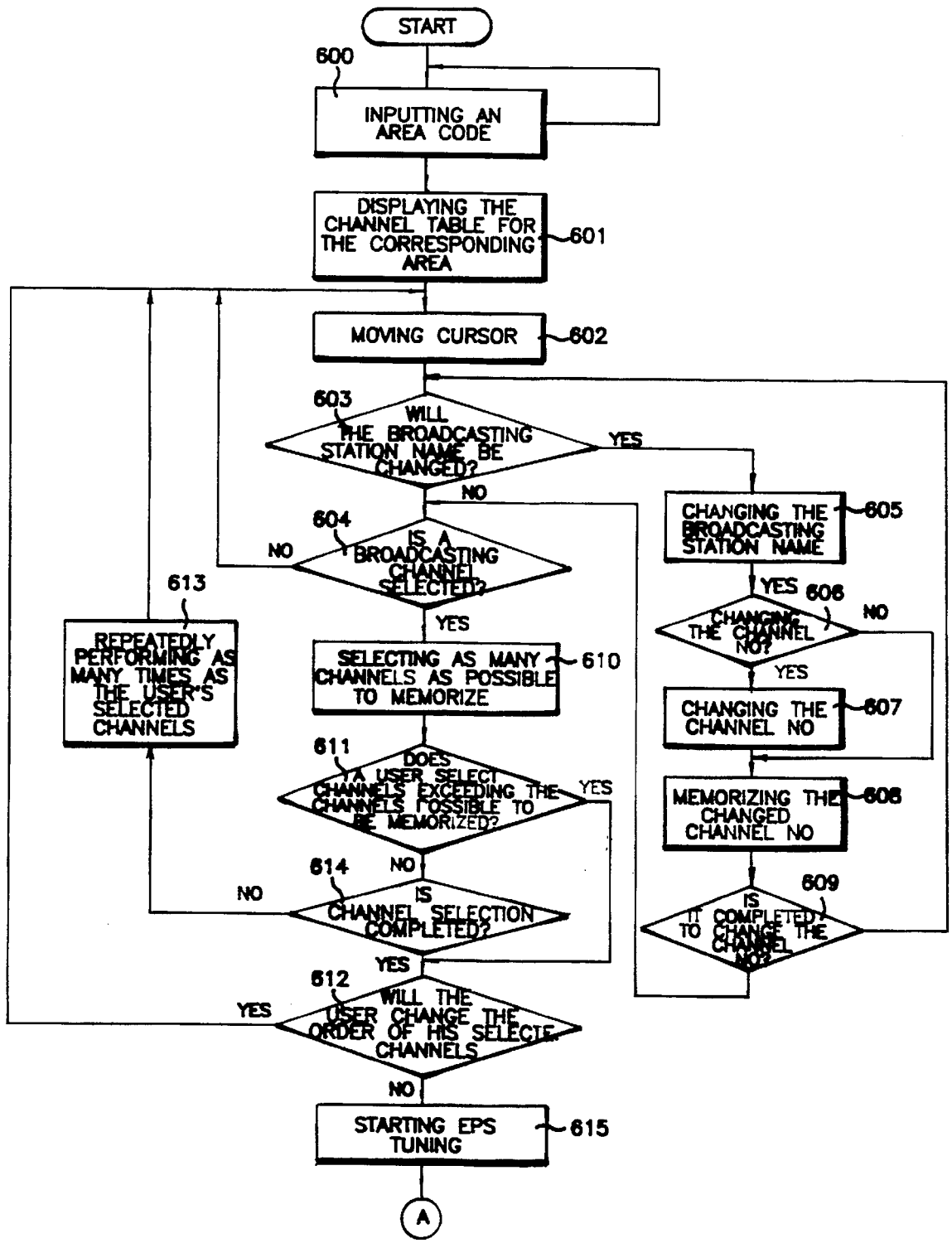

FIG. 14 shows the automatic channel memory control method according to a sixth embodiment of the present invention, which will be described hereinbelow.

Microcomputer 14 stores the broadcasting data on the cities and local areas of a nation, e.g., the channel numbers for Seoul MBC and Kyungnam MBC are 11 and 13, respectively. If an area code is input (step 600), the channel table for the corresponding area is controlled to be displayed in display 15 (step 601) so that the user can select his desired channel viewing the displayed channel table.

When the user selects a channel, he views the channel table which channel data, i.e., channel number or broadcasting station name, are listed therein, as shown in FIG. 15A. By using a remote controller, up/down keys or arrow keys (step 602), the user selects his desired channel (step 604) (see FIG. 15B). Prior to the user's selection of channel, microcomputer 14 detects whether the user will change the broadcasting station name or channel number (step 603).

Step 603 is a provision for the case when channel number or broadcasting station name is changed by the establishment of CATVs or satellite broadcasting systems.

If a broadcasting station name is changed (step 605), channel number can also be changed (step 606). If the channel number is changed (step 607), the changed channel number is memorized (step 608). If the changed items are added, the above processes are repeatedly performed (step 609), thereby changing channel number or broadcasting station name.

If a broadcasting channel is selected in step 604, a broadcasting signal received via antennae is detected in IF unit 11 as a video signal to then be memorized in E²PROM 13 for each channel position. The user can selects as many channels (n=40) as possible to memorize in E²PROM 13 and some users may select less channels than that (step 610).

If a user selects channels exceeding the channels possible to be memorized in E²PROM 13 (step 611), the user is questioned by microcomputer 14 whether he will change the order of his selected channels (step 612). If he will change, only with respect to the channels to be changed, the above processes following step 602 are performed again.

Those processes are repeatedly performed as many times as the user's selected channels (step 613). If channel selection is completed (step 614), microcomputer 14 performs step 612 again. Then, if there is no further channel to be changed, EPS tuning is performed (step 615).

Thereafter, it is confirmed that channels are memorized (step 616). If the channels are not memorized, waiting is continued until the channels are tuned. Then, if the channels are memorized, the memorized channels are upcounted (step 617). Then, the tuned channel is compared with the channel input by the user in step 604 (step 618) (see FIG. 15C). If they are the same, it is detected whether the channel positions of the user's set channel are all input or not (step 619).

If all channel positions are input in step 619, the channel is memorized in the tuning order after the user's set channel position (step 620). If not input, the tuned channel is memorized in the channel position which the user selects (step 621).

If the channel being tuned in step 618 and that selected by the user are not the same, sorting is performed to confirm whether there is a tuned channel, among the user's selected channels (step 622). If there is no same channel number (step 623), the channel is memorized in the tuning order after the user's set channel position (step 624). If there is the same broadcasting station name (step 623), it is detected whether the channel positions of the user's selected channels are all input or not (step 625).

If all channel positions are input in step 625, the channel is memorized in the tuning order after the user's set channel position (step 628). If not input, the tuned channel is memorized in the channel position of the channel which the user selects (step 627).

While upcounting by one (step 617), the above processes are repeatedly performed (step 628). Thereafter, if the channel memory is completed (step 629) (see FIG. 15D), microcomputer 14 displays the channel numbers sorted in the memory order on OSD or live screen (step 630). At this time, tuning is completed at the same time when the channel memory is completed (step 631).

As described above, the present invention allows the user to select his desired channel simply, easily and variously.

What is claimed is:

1. A channel memory method for channel selection and tuning comprising the steps of:

sequentially inputting a user's desired broadcasting station names to a channel table to set channel positions for the station names (a first step);

performing a tuning (a second step);

comparing and sorting broadcasting station names so that a tuned channel is matched with a set channel position in the channel table (a third step); and displaying channels in an order corresponding to the set channel positions in the channel table (a fourth step).

2. The channel memory method as claimed in claim 1, wherein said first step includes the processes of:

displaying channel table in case of a tuning mode (a first process);

displaying inputs if a user inputs his desired broadcasting station names by moving a cursor (a second process); and repeatedly performing said first and second processes, and performing said second step if an enter key is input (a third process).

3. The channel memory method as claimed in claim 1, wherein said third step includes the processes of:

comparing a user's selected broadcasting station name and the broadcasting station name of a tuned channel (a first process);

sorting broadcasting station names if the user's selected broadcasting station name and the broadcasting station name of a tuned channel are not the same, and memorizing the corresponding broadcasting station name on the corresponding channel position (a second process);

immediately memorizing the corresponding broadcasting station name on the corresponding channel position if the user's selected broadcasting station name and the broadcasting station name of a tuned channel are the same (a third process); and performing said first, second and third processes depending on a memory capacity to complete said sorting process (a fourth process).

* * * * *